3,029,258
17-OXYGENATED 9α-FLUOROANDROST-
4-EN-3-ONES
Clarence G. Bergstrom, Chicago, Ill., and Raymond M. Dodson, Minneapolis, Minn., assignors to G. D. Searle & Co., Chicago, Ill., a corporation of Delaware
No Drawings. Filed May 5, 1961, Ser. No. 107,941
10 Claims. (Cl. 260—397.3)

The present invention is concerned with novel 9α-fluorosteroids and, more particularly, with 17-oxygenated 9α-fluoroandrost-4-en-3-ones as represented by the following structural formulae

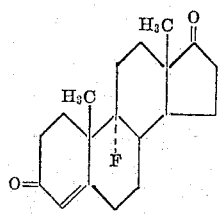

and

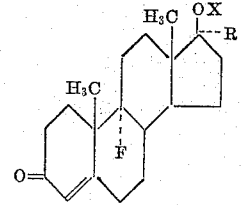

wherein X is hydrogen or a lower alkanoyl radical, and R is hydrogen or a hydrocarbon radical selected from the class consisting of lower alkyl, lower alkynyl, and lower alkenyl radicals.

Hydrocarbon radicals represented by R are exemplified by methyl, ethyl, propyl, butyl, pentyl, hexyl, ethynyl, propynyl, butynyl, pentynyl, hexynyl, vinyl, propenyl, butenyl, pentenyl, hexenyl, and the branched-chain isomers thereof.

The lower alkanoyl radicals encompassed by the X term are typified by formyl, acetyl, propionyl, butyryl, valeryl, caproyl, and the branched-chain isomers thereof, said groups being the acyl radicals of alkanoic acids containing fewer than 7 carbon atoms.

Starting materials suitable for the manufacture of the instant compounds are exemplified by 11β-hydroxy-androst-4-ene-3,17-dione, 9α-hydroxyandrost-4-ene-3,17-dione, androsta-4,9(11)-diene-3,17-dione, and the corresponding 17β-hydroxy and 17β-(lower alkanoyl)oxy compounds. As a specific example, 11β-hydroxyandrost-4-ene-3,17-dione is treated with a solution of hydrogen fluoride in pyridine to afford 9α-fluoroandrost-4-ene-3,17-dione.

A process suitable for the preparation of the 17α-alkynyl-17β-hydroxy compounds of this invention involves the conversion of the aforementioned 9α-fluoro-androst-4-ene-3,17-dione to the corresponding 3-enol ether, which is allowed to react with the appropriate alkyne in the presence of an alkaline catalyst. Thus, the aforementioned 9α-fluoroandrost-4-ene-3,17-dione is treated with ethanol and ethyl orthoformate in the presence of p-toluenesulfonic acid to yield 3-ethoxy-9α-fluoroandrosta-3,5-dien-17-one, which is allowed to react with acetylene in the presence of potassium hydroxide to afford, after hydrolysis of the enol ether, 17α-ethylnyl-9α-fluoro-17β-hydroxyandrost-4-en-3-one.

Partial hydrogenation of the aforementioned 17α-alkynyl-17β-hydroxy compounds affords the corresponding 17α-alkenyl-17β-hydroxy compounds, which can be further hydrogenated to produce the 17α-alkyl-17β-hydroxy compounds of this invention. These processes are specifically illustrated by the reaction of 17α-ethylnyl-9α-fluoro-17β-hydroxyandrost-4-en-3-one with one molecular equivalent of hydrogen in the presence of 5% palladium-on-calcium carbonate catalyst to yield 9α-fluoro-17β-hydroxy-17α-vinylandrost-4-en-3-one, which is allowed to react with hydrogen in the presence of 5% palladium-on-carbon catalyst to afford 17α-ethyl-9α-fluoro-17β-hydroxyandrost-4-en-3-one.

Acylation of the instant 17α-(hydrocarbon substituted)-17β-hydroxy compounds affords the corresponding 17β-alkanoates of this invention. Typically, 17α-ethylnyl-9α-fluoro-17β-hydroxyandrost-4-en-3-one is treated with acetic anhydride in pyridine to produce 17β-acetoxy-17α-ethylnyl-9α-fluoroandrost-4-en-3-one.

The compounds of the present invention display valuable pharmacological properties. They are, for example, hormonal agents as evidenced by their anabolic and androgenic properties. In addition, the compounds containing a 17-hydrocarbon substituent are progestational agents.

This application is a continuation-in-part of our copending application, Serial No. 773,560, filed November 13, 1958.

The present invention will appear more fully from the examples which follow. These examples are set forth by way of illustration only and are not to be construed as limiting the invention either in spirit or in scope. It will be apparent to those skilled in the art of organic synthesis that many modifications of materials and methods may be practiced without departing from this invention. In these examples, temperatures are given in degrees centigrade (° C.) and quantities of materials in parts by weight, except where otherwise noted. Optical rotations are carried out in chloroform solution except where otherwise indicated.

*Example 1*

A concentrated solution of hydrogen fluoride in pyridine is prepared by passing a stream of anhydrous hydrogen fluoride through 95 parts of pyridine contained in a large vessel. During the addition the temperature is maintained below 50° by means of a cooling bath. The resulting solution contains about 74.8% of hydrogen fluoride and about 25.2% of pyridine.

A solution of 0.5 part of 11β-hydroxyandrost-4-ene-3,17-dione in 10 parts of the aforementioned hydrogen fluoride-pyridine reagent is stored at room temperature for about 29 hours, then treated with 90 parts of ethyl acetate and 50 parts of water. The organic layer is separated, washed successively with water, saturated aqueous sodium bicarbonate, and water, dried over anhydrous sodium sulfate, then concentrated to afford a yellow crystalline product. These yellow crystals are dissolved in benzene and the resulting solution is chromatographed on a silica gel column. The column is then developed with benzene and benzene solutions containing increasing amounts of ethyl acetate. The 10% ethyl acetate in benzene eluate yields a fraction which is recrystallized from acetone-petroleum ether to afford 9α-fluoroandrost-4-ene-3,17-dione, M.P. about 227–228°. This compound possesses infrared absorption maxima at about 5.75, 6.00, 7.46, 8.05, 9.60, 9.75, 11.28, and 11.56 microns, and also an ultraviolet absorption maximum at about 237 millimicrons with a molecular extinction coefficient of about 17,800.

*Example 2*

A solution of 2 parts of 11β,17β-dihydroxyandrost-4-en-3-one in 20 parts of hydrogen fluoride-pyridine reagent is stored at room temperature for about 4 hours, then treated with 50 parts of water and 150 parts of ethyl acetate. The ethyl acetate solution is washed successively with aqueous sodium bicarbonate and water, then concentrated to dryness under reduced pressure. A solution of the residue in benzene is chromatographed on silica gel, and the column is developed with benzene solutions containing increasing amounts of ethyl acetate. Elution with 15% ethyl acetate in benzene and recrystallization of the resulting fraction from acetone-petroleum ether affords 9α-fluoro-17β-hydroxyandrost-4-en-3-one, M.P. about 206–207°.

*Example 3*

A solution of 1.1 parts of 17β-acetoxy-11β-hydroxyandrost-4-en-3-one in 11 parts of hydrogen fluoride-pyridine reagent is kept at 0° for about 4 hours, then is treated with 225 parts of ethyl acetate and 100 parts of water. The organic layer is separated, washed successively with water, aqueous sodium bicarbonate, and water, dried over anhydrous sodium sulfate, and concentrated to dryness in vacuo. The pale yellow syrupy material obtained is crystallized from acetone-petroleum ether to produce 17β-acetoxy-9α-fluoroandrost-4-en-3-one, M.P. about 197.5–198.5°. This substance is further characterized by an ultraviolet maximum at about 237.5 millimicrons with a molecular extinction coefficient of about 16,800, and also a specific rotation of about +71°.

*Example 4*

A mixture of 0.2 part of 9α-fluoro-17β-hydroxyandrost-4-en-3-one, 2 parts of pyridine and 2 parts of propionic anhydride is allowed to stand at room temperature for about 15 hours, then is diluted with cold water. The resulting crystalline precipitate is collected by filtration, then recrystallized from acetone-petroleum ether to produce 9α-fluoro-17β-propionoxyandrost-4-en-3-one, M.P. about 163–165°; $[\alpha]_D = +62.0°$. It is characterized further by an ultraviolet absorption maximum of about 238 millimicrons with a molecular extinction coefficient of about 17,300.

*Example 5*

A solution of 5.85 parts of 9α-fluoroandrost-4-ene-3,17-dione, 0.58 part of p-toluenesulfonic acid monohydrate, 4.6 parts of anhydrous ethanol, and 53.5 parts of ethyl orthoformate in 288 parts of purified dioxane is stored at room temperature, under nitrogen, for about 7 hours. The yellow reaction mixture is then poured into 2,500 parts of saturated aqueous sodium bicarbonate, and this aqueous mixture is extracted with benzene. The benzene layer is washed with water and dried over anhydrous sodium sulfate, then evaporated to dryness at reduced pressure. The resulting residue is dissolved in benzene, and this organic solution is chromatographed on alumina. Elution of the column with benzene affords a crystalline fraction, which is recrystallized from benzene-pentane to produce pure 3-ethoxy-9α-fluoroandrosta-3,5-dien-17-one, M.P. about 153–161°. This substance displays infrared maxima at about 5.76, 6.03, 6.13, 8.51, and 11.69 microns and also an ultraviolet absorption maximum at about 240 millimicrons with a molecular extinction coefficient of about 21,400.

*Example 6*

A solution containing 20 parts by volume of diethylene glycol monomethyl ether and 280 parts by volume of diethylene glycol dimethyl ether is heated in a 139° bath, under nitrogen, then treated with 53.4 parts of potassium hydroxide with vigorous stirring. Stirring is continued for about 30 minutes, during which time the bath temperature rises to 146°. The alkaline mixture is then allowed to cool with stirring, resulting in a silky dispersion.

A stream of acetylene is passed over the surface of 190 parts by volume of the latter dispersion, under nitrogen, for about 2 hours, and a solution of 1.86 parts of 3-ethoxy-9α-fluoroandrosta-3,5-dien-17-one in 48 parts of diethylene glycol dimethyl ether is then added. Stirring and acetylene addition are continued for about 3 hours, after which time the reaction mixture is poured into ice and water. The resulting aqueous mixture is extracted with ethyl acetate, and the organic extract is washed with water, dried over anhydrous sodium sulfate, and concentrated to dryness at reduced pressure. The residue is dissolved in acetone and treated with dilute hydrochloric acid to effect hydrolysis of the enol ether. The mixture is cooled in an ice bath, then filtered to afford 17α-ethynyl-9α-fluoro-17β-hydroxyandrost-4-en-3-one, M.P. about 296.5° (dec.). The product can be purified further by recrystallization from acetone to afford a sample which displays infrared maxima at about 2.92, 3.06, 4.74, 6.02, and 6.17 microns and an ultraviolet absorption maximum at about 237.5 millimicrons with an extinction coefficient of about 16,000.

*Example 7*

The substitution of an equivalent quantity of propyne for acetylene in the process of Example 6 results in 9α-fluoro-17β-hydroxy-17α-propynylandrost-4-en-3-one.

*Example 8*

To a solution of 1.53 parts of 17α-ethynyl-9α-fluoro-17β-hydroxyandrost-4-en-3-one in 200 parts of pyridine is added one part of 5% palladium-on-calcium carbonate catalyst, and this mixture is stirred in a hydrogen atmosphere until one molecular equivalent of hydrogen is absorbed. The catalyst is removed by filtration and the filtrate is concentrated at reduced pressure. A solution of the residue in benzene is chromatographed on silica gel and the column is developed with benzene solutions containing increasing proportions of ethyl acetate. The 10% ethyl acetate in benzene eluate affords a fraction which is recrystallized from acetone-hexane to produce pure 9α-fluoro-17β-hydroxy-17α-vinylandrost-4-en-3-one, M.P. about 193.5–196.5°; $[\alpha]_D = +56.5°$ (1% in dioxane). This substance displays infrared absorption maxima at about 2.86, 5.98, and 6.16 microns, and a maximum in the ultraviolet at about 237.5 millimicrons with a molecular extinction coefficient of about 16,100.

*Example 9*

The substitution of an equivalent quantity of 9α-fluoro-17β-hydroxy-17α-propynylandrost-4-en-3-one for 17α-ethynyl-9α-fluoro-17β-hydroxyandrost-4-en-3-one in the process of Example 8 results in 9α-fluoro-17β-hydroxy-17α-propenylandrost-4-en-3-one.

*Example 10*

A mixture of 9.3 parts of 9α-fluoro-17β-hydroxy-17α-vinylandrost-4-en-3-one, 1,000 parts of dioxane, and 3 parts of 5% palladium-on-carbon catalyst is stirred in a hydrogen atmosphere until one molecular equivalent of hydrogen is absorbed. Removal of the catalyst by filtration affords a filtrate which is concentrated to dryness at reduced pressure. A solution of the syrupy residue in benzene is chromatographed on silica gel and the column is developed with benzene solutions containing increasing proportions of ethyl acetate. Elution with 10% ethyl acetate in benzene affords a fraction which is recrystallized from acetone-hexane to produce pure 17α-ethyl-9α-fluoro-17β-hydroxyandrost-4-en-3-one, M.P. about 198–199°; $[\alpha]_D = +51°$ (0.5% in chloroform). An ultraviolet absorption maximum is observed at about 237.5 millimicrons with a molecular extinction coefficient of about 17,400, and infrared maxima are observed at about 2.68, 2.74, 5.98, and 6.17 microns.

*Example 11*

The substitution of an equivalent quantity of 9α-fluoro-17β-hydroxy-17α-propenylandrost-4-en-3-one for 9α-fluoro-17β-hydroxy-17α-vinylandrost-4-en-3-one in the procedure of Example 10 produces 9α-fluoro-17β-hydroxy-17α-propylandrost-4-en-3-one.

Example 12

A mixture of one part of 17α-ethynyl-9α-fluoro-17β-hydroxyandrost-4-en-3-one, 2 parts of acetic anhydride, and 5 parts of pyridine is heated at the reflux temperature for about 3 hours, then is cooled and diluted with ice and water. Extraction of this aqueous mixture with ether affords an organic solution, which is washed successively with dilute hydrochloric acid, water, and aqueous sodium bicarbonate, then dried over anhydrous sodium sulfate, and evaporated to dryness to produce 17β-acetoxy-17α-ethynyl-9α-fluoroandrost-4-en-3-one.

Example 13

The substitution of an equivalent quantity of propionic anhydride for acetic anhydride in the procedure of Example 12 results in 17α-ethynyl-9α-fluoro-17β-propionoxyandrost-4-en-3-one.

Example 14

By substituting an equivalent quantity of 9α-fluoro-17β-hydroxy-17α-vinylandrost-4-en-3-one for 17α-ethynyl-9α-fluoro-17β-hydroxyandrost-4-en-3-one in the procedure of Example 12 and increasing the period of reflux to about 4 hours, 17β-acetoxy-9α-fluoro-17α-vinylandrost-4-en-3-one is obtained.

Example 15

The reaction of 9α-fluoro-17β-hydroxy-17α-vinylandrost-4-en-3-one and propionic anhydride by the process of Example 12 results in 9α-fluoro-17β-propionoxy-17α-vinylandrost-4-en-3-one.

Example 16

By substituting an equivalent quantity of 17α-ethyl-9α-fluoro-17β-hydroxyandrost-4-en-3-one for 17α-ethynyl-9α-fluoro-17β-hydroxyandrost-4-en-3-one in the process of Example 12 and increasing the period of reflux to about 6 hours, 17β-acetoxy-17α-ethyl-9α-fluoroandrost-4-en-3-one is obtained.

Example 17

The reaction of 17α-ethyl-9α-fluoro-17β-hydroxyandrost-4-en-3-one and propionic anhydride by the procedure of Example 12 results in 17α-ethyl-9α-fluoro-17β-propionoxyandrost-4-en-3-one.

What is claimed is:
1. A compound of the structural formula

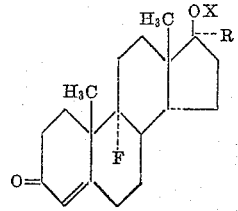

wherein X is selected from the group consisting of hydrogen and lower alkanoyl radicals, and R is selected from the group consisting of hydrogen, lower alkyl, lower alkynyl, and lower alkenyl radicals.

2. A compound of the structural formula

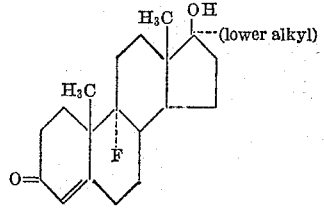

3. A compound of the structural formula

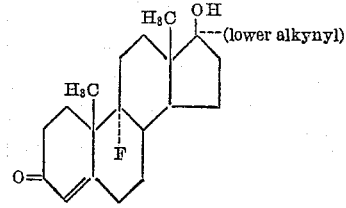

4. 9α-fluoroandrost-4-ene-3,17-dione.
5. 9α-fluoro-17β-hydroxyandrost-4-en-3-one.
6. 17β-acetoxy-9α-fluoroandrost-4-en-3-one.
7. 9α-fluoro-17β-propionoxyandrost-4-en-3-one.
8. 17α-ethynyl-9α-fluoro - 17β - hydroxyandrost-4-en-3-one.
9. 9α-fluoro-17β-hydroxy-17α-vinylandrost-4-en-3-one.
10. 17α-ethyl-9α-fluoro-17β-hydroxyandrost-4-en-3-one.

No references cited.